United States Patent [19]
Oishi

[11] Patent Number: 4,750,074
[45] Date of Patent: Jun. 7, 1988

[54] MAGNETIC TAPE CASSETTE WITH TAPE LOCKING MEANS

[75] Inventor: Kengo Oishi, Kanagawa, Japan

[73] Assignee: Fuji Photo Film Co., Ltd., Kanagawa, Japan

[21] Appl. No.: 809,811

[22] Filed: Dec. 17, 1985

[30] Foreign Application Priority Data

Dec. 21, 1984 [JP] Japan .............................. 59-192994

[51] Int. Cl.⁴ ......................................... G11B 23/087
[52] U.S. Cl. ..................................................... 360/132
[58] Field of Search ......................... 360/132; 242/198

[56] References Cited

U.S. PATENT DOCUMENTS 4,572,461 2/1986 Horikawa et al. ................. 360/132

Primary Examiner—Robert S. Tupper
Attorney, Agent, or Firm—Sughrue, Mion, Zinn, Macpeak & Seas

[57] ABSTRACT

In a magnetic tape cassette of the type having a pivotable guard member for closing the cassette opening when the cassette is removed from a cassette machine, a braking member is coupled to the guard member and is urged into contact with the hubs upon closing of the guard member to prevent rotation of the hubs when the cassette is not in use.

4 Claims, 2 Drawing Sheets

MAGNETIC TAPE CASSETTE WITH TAPE LOCKING MEANS

BACKGROUND OF THE INVENTION

This invention relates to magnetic tape cassettes, and more specifically to compact magnetic tape cassettes which are equal to or smaller than the "Philips" type magnetic tape cassette in size and can be used for audio devices or the like.

Recently, cassette tape recorders have been remarkably reduced both in size and in weight, and accordingly magnetic tape cassettes used for them have also been miniaturized and have become quite popular. In this connection, there has been a strong demand for the provision of a magnetic tape cassette which is suitable for high quality and high density signal recording and reproducing and which will have a long useful life. As is well known in the art, these criteria can be satisfied by employing a digital system such as a pulse code modulation (PCM) system. In a PCM system, unlike an analog system, the recording and reproducing operation is carried out with the input signal pulse-modulated. Furthermore, in the digital system, it is essential that the magnetic tape of the magnetic tape cassette have a recording frequency band which is about five times as wide as a recording frequency band for a conventional audio magnetic tape. For this reason, a large video tape cassette, which is wider in recording frequency band than an audio compact cassette, is extensively employed as a magnetic tape cassette in a digital system. Video tape cassettes, except for special ones, are for rotary head type video tape recorders. The structure of the video tape cassette is such that a guard panel is provided which can close the opening formed in the front part of the cassette and which can swing open upwardly.

In cassettes employing the digital system, as in video tape cassettes, the cassette should be so constructed that it is excellent in dust-proof and tape protection characteristics because the recording and reproduction operation in digital tape cassettes is shorter in recording wavelength, higher in recording density, and wider in frequency band than in conventional audio compact cassettes.

A magnetic tape cassette satisfying the above-described requirements, i.e., a magnetic tape cassette to which the technical concept of the invention is applicable, can be used for audio devices or the like which employ a recording and reproducing system with a relatively wide frequency band, similar to the above-described video tape cassette. Since the compact magnetic tape cassette to which the technical concept of the invention is applicable is small, that is, one which is equal to or smaller than a conventional audio compact cassette, it is expected that the compact magnetic tape cassette will be carried and used outdoors as frequently as, if not more frequently than, the conventional audio compact cassette. Accordingly, the magnetic tape cassette should be constructed with an excellent dust-proof mechanism, which does not adversely affect operation. In addition, the magnetic tape cassette should be constructed so as to positively prevent tape jamming which might occur due to the tape being slackened due to vibration of the cassette during transportation.

SUMMARY OF THE INVENTION

An object of this invention is to eliminate the above-described difficulties. More specifically, an object of the invention is to provide a digital audio magnetic tape cassette which is so designed that the tape protecting and dust-proofing member does not adversely affect operation, and that the tape protecting and dust-proofing effect is excellent. It is a further object of the invention to provide a digital audio magnetic tape cassette in which unintentional rotation of the hubs is positively prevented.

The foregoing objects of the invention have been achieved by the provision of a magnetic tape cassette which incorporates a pair of hubs on which a magnetic tape is wound, and a lock member having a pair of protrusions adapted to lock the hubs. The lock member also has arms which are extended in a direction opposite to the direction in which the protrusions are extended. The ends of the arms have pawls which extend perpendicular to the arms and which face away from each other. The magnetic tape cassette also comprises an opening through which the magnetic tape can be partially pulled out of the cassette, a guard panel swingable to close the front part of the opening, and a slide guard to close the lower part of the opening. According to the invention, the lock member is so designed that when the guard panel swings open, the right and left end pieces of the guard panel are engaged with the pawls on the arms of the lock member, thereby causing the lock member to slide forwardly. A locking part is also provided on at least one of the right and left end pieces of the guard panel, so that when the guard panel closes, the locking part or parts engage the corresponding arm or arms thereby preventing forward sliding of the lock member.

DETAILED DESCRIPTION OF THE PREFERRED EMBODIMENTS

One embodiment of the invention will be described with reference to the accompanying drawings in detail.

Figure 1:
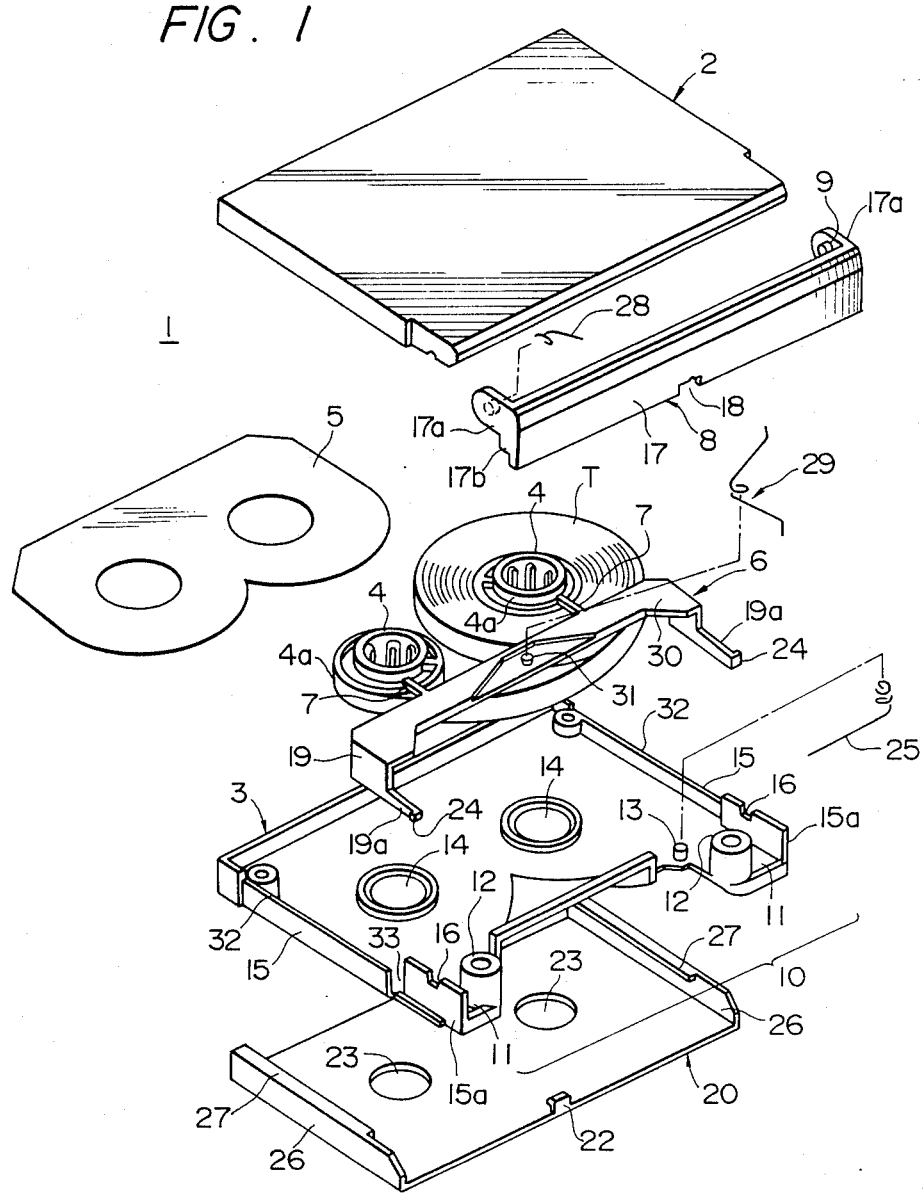
FIG. 1 is an exploded perspective view showing one embodiment of the invention.

A magnetic tape cassette 1 shown in FIG. 1 is the same size as, or smaller than, a conventional compact magnetic tape cassette employed in an audio device or the like. The magnetic tape cassette 1 comprises: a cassette case consisting of upper and lower half-cases 2 and 3, a pair of flangeless hubs 4 on which a magnetic tape T is wound; a first friction sheet 5 and a second friction sheet (not shown) identical to the first friction sheet, both for smoothly turning the hubs 4; a lock member 6 for preventing unwanted rotation of the hubs 4, the lock member 6 together with the hubs 4 and the first friction sheet 5 and the second friction sheet being accommodated in the cassette case; a guard panel 8 for closing a front part of an opening 10 formed in a front wall 17 of the cassette case; and a slide guard 20 for closing a lower part of the opening 10.

Each hub 4 has a peripheral ring 4a which protrudes from and is coaxial with the tape winding surface of the hub 4 so that each peripheral ring 4a is engaged with one of two protrusions 7 of the lock member 6, thereby preventing unwanted rotation of the hubs 4.

The guard panel 8 is U-shaped in horizontal section similar to that of a conventional video tape cassette, and the guard panel 18 has end pieces 17a at both ends. Rotating pins 9 are protruded from the end pieces 17a such that the rotating pins 9 confront each other. Furthermore, locking parts or locking tabs 17b are extended from the end pieces 17a so as to prevent the lock member 6 from sliding toward the front of the cassette. The locking parts 17b are so shaped that they are hidden by the slide guard 20 when slide guard 20 is closed. When the upper and lower half-cases 2 and 3, respectively, are combined together, notches or holes 16 are formed in side walls 15 of the lower half-case 3. The guard panel 8 is mounted on the cassette case with the rotating pins 9 rotatably fitted in the holes 16 thus formed. The guard panel 8 is urged by a spring 28 to close the opening 10.

A cut 18 is formed in the lower edge and at the center of the front wall 17 of the guard panel 8 so that the magnetic tape cassette is correctly inserted in the magnetic tape recording and reproducing device. That is, the cut 18 is engaged with an erroneous-insertion preventing mechanism of a magnetic tape recording and reproducing device, e.g., a protrusion formed on a bucket, i.e., a cassette receiving means in a cassette insertion section. Therefore, the magnetic tape cassette can be loaded in the magnetic tape recording and reproducing device only when the magnetic tape cassette is held in the correct insertion direction.

Figure 3:
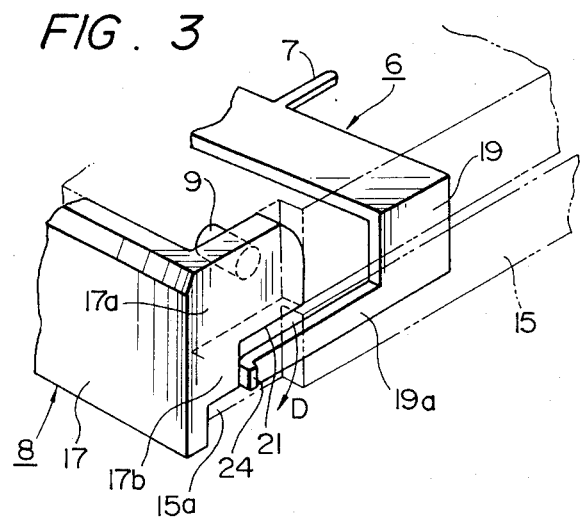
FIG. 3 is a perspective view showing essential components of a lock member for a description of the operation of a lock member in the magnetic tape cassette.

The lock member 6 comprises: an upper plate 30 which is disposed adjacent to the inner wall of the upper half-case 2 and is movable toward a front or back of the cassette case; arms 19 extending from both ends of the upper plate 30 in such a manner that the arms 19 are parallel with the side walls 15 of the cassette case; and projections 19a extending from the lower portions of the arms 19 towards the front wall 17 of the cassette case. Furthermore, the upper plate 30 has the aforementioned protrusions 7 which are engaged with the hubs 4. At the ends of the projections 19a of the arms 19 there are right and left pawls 24 which are extended to the right and left, respectively, as shown in FIG. 3.

A trapezoidal step 33 is formed in the central portion of the upper plate 30 of the lock member 6 in such a manner that the trapezoidal step 33 diverges towards the front of the cassette. A spring locking pin 31 is formed on the trapezoidal step 33, and a lock member spring 29 is mounted on the pin 31 in such a manner that the middle parts of the spring 29 are abutted against a front portion of the inner wall of the upper half-case 2. Therefore, the lock member 6 is maintained urged toward the rear of the cassette case.

Similar to a lower half-case of a conventional video tape cassette, the lower half-case 3 has a pair of reel shaft inserting holes 14 which correspond to the hubs 4, and tape drawing outlets 11 at the right and left ends of the opening 10 so that the magnetic tape T can be drawn toward the front of the cassette. A front portion of the lower half-case 3 which is located between the tape drawing outlets 11 has a recess so that when the magnetic tape cassette 1 is loaded on the magnetic tape recording and reproducing device, a tape drawing member of the magnetic tape recording and reproducing device can enter the cassette 1 from below.

Steps 32 are formed on the upper edges of the side walls 15 of the lower half-case 3 so that when the upper and lower half-cases, 2 and 3, respectively, are combined, horizontal slits extending along upper edges of the side walls 15 are formed. Partition walls 15a are provided in front of the side walls 15 of the lower half-case 3. The partition walls 15a are in parallel with the side walls 15 and shifted slightly towards the inside of the cassette in relation to the side walls.

The lock member 6 is mounted on the lower half-case 3 in such a manner that one of the projections 19a which are movable along the side walls 15, is loosely fitted between one side wall 15 and a corresponding partition wall 15a and the other of the projections 19a is loosely fitted between the other side wall 15 and another corresponding partition wall 15a.

The slide guard 20 is like a plate with side pieces 26 at both ends. More specifically, the side pieces 26 are extended perpendicular to the plate so that the side pieces 26 are parallel to the side walls 15 of the lower half-case 3. That is, the slide guard 20 is substantially U-shaped in section. Hangovers 27 are slightly extended inwardly from upper edges of the side pieces 26. The plate-shaped portion of the slide guard 20 which confronts the bottom of the lower half-case 3 has two through-holes 23 which correspond to the aforementioned reel shaft inserting holes 14, and an engaging protrusion 22 which is engaged with a slide guard spring 25 for urging the slide guard 20 toward the front of the cassette. The engaging protrusion 22 is received by the cut 18 of the guard panel 8.

Similar to a conventional video tape cassette, the front part of the upper half-case 2 is formed so that when the upper half-case 2 is combined with the lower half-case 3, these half-cases 2 and 3 form the aforementioned tape drawing outlets 11. Means (not shown) for regulating the rotational positions of the hubs 4 is provided on the inner surface of the upper half-case 2.

In assembling the magnetic tape cassette 1, the slide guard 20 is mounted on the lower half-case 3 from below. In this case, the upper edges of the steps 32 formed on the side walls 15 of the lower half-case 3 are engaged with lower surfaces of the hangovers 27 of the slide guard 20.

One end of the slide guard spring 25 is fitted on a locking pin 13 formed on the lower half-case 3, and the other end of the slide guard spring 25 is engaged with the aforementioned engaging protrusion 22. Therefore, the slide guard 20 is urged toward the front of the cassette by the slide guard spring 25.

After the first friction sheet 5 is laid on the inner surface of the lower half-case 3, the hubs 4, on which the magnetic tape T has been wound, are placed on the first friction sheet 5 so as to meet the reel shaft inserting holes 14. Under this condition, the magnetic tape T is partially pulled out of the cassette through the tape drawing outlets 11 and laid over right and left tape guides 12. The second friction sheet (not shown) is laid on the hubs 4 thus arranged. The lock member 6 is placed over the second friction sheet thus laid, and is then urged toward the rear of the cassette case by the aforementioned spring 29.

The guard panel 8 is mounted with the rotating pins 9 rotatably inserted in the holes 16, and the guard panel 8 is urged to close by the guard panel spring 28.

After the upper half-case 2 is mounted, the upper and lower half-cases 2 and 3, respectively, are tightened together with screws or the like. Thus, the magnetic tape cassette 1 has been assembled.

During storage of the magnetic tape cassette thus assembled, the opening 10 is maintained closed by the guard panel 8 and the slide guard 20, and the hubs 4 are prevented from rotating because the peripheral rings 4a are abutted against the protrusions 7 of the lock member 6.

The upper and lower half-cases 2 and 3, respectively, the guard panel 8, and the lock member 6 may be made of plastic resin such as polyacetal resin, ABS resin or Ps resin, as in the case of a conventional video tape cassette. The slide guard 20 may also be made of the aforementioned plastic resin. The slide guard 20 may alternatively be made of metal such as stainless steel; however, it is desirable that the slide guard 20 be made of plastic resin which shows a high wear resistance to the upper and lower half-cases 2 and 3, respectively, because the sliding operation of the metal slide guard 20 scrapes the cassette body which is made of plastic resin.

The magnetic tape T may be a ferromagnetic iron oxide or chromium dioxide one; however, it is preferable to employ a magnetic tape such as a metal tape or vacuum deposition tape which is suitable for high-density recording and reproducing operation.

The operations of the members of the magnetic tape cassette thus constructed will now be described.

Figure 2:
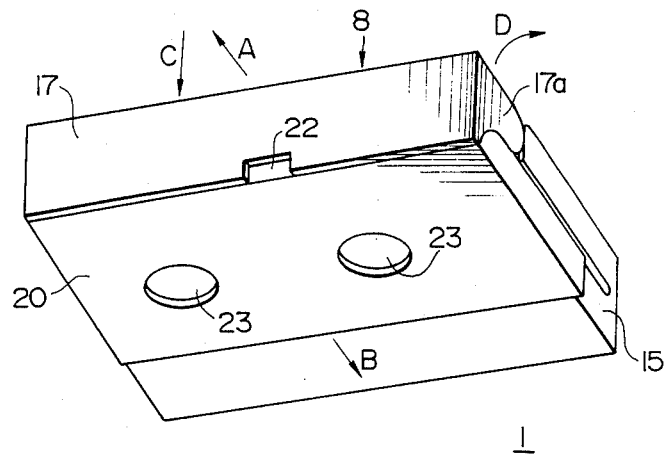
FIG. 2 is a perspective view showing a magnetic tape cassette which is obtained by assembling the components shown in FIG. 1.

In inserting the magnetic tape cassette 1 into the cassette insertion section of the magnetic tape recording and reproducing device, the opening 10 of the cassette 1 is directed forwards (facing in the direction of arrow A in FIG. 2). In this operation, the engaging protrusion 22 of the slide guard 20 is abutted against the erroneous-insertion preventing protrusion in the cassette insertion section, so that the slide guard 20 is slid toward the rear of the cassette (in the direction of arrow B in FIG. 2) thus opening the lower part for the opening 10. As a result, the through holes 23 coincide with the reel shaft inserting holes 14 so that the reel shafts of the magnetic tape recording and reproducing device can be inserted into the cassette.

Thereafter, the magnetic tape cassette 1 is moved downward (i.e., in a direction perpendicular to the direction of insertion, as indicated by arrow C). In this movement, the lower edge of the guard panel 8 is abutted against the guard panel opening means (not shown) which is provided in the inner part of the cassette insertion section, so that the guard panel 8 is swung upwardly (as indicated by arrow D) about the rotating pins 9. In this operation, the lower edges 21 of the right and left end pieces 17a of the guard panel 8 engage with the pawls 24 of the lock member 6, thus causing the lock member 6 to slide toward the front of the cassette. As a result, the protrusions 7 of the lock member 6 are disengaged from the peripheral rings 4a of the hubs 4 to permit rotation of the hubs 4.

As is apparent from the above description, the loading operation of the magnetic tape cassette 1 is achieved by inserting the cassette and moving the cassette downward. As the slide guard 20 is slid and the guard panel 8 is swung open, the opening 10 becomes fully opened, and the peripheral rings 4a are disengaged from the protrusions 7 of the lock member 6. As a result, the magnetic tape T can be partially pulled out of the cassette through the opening 10, and the hubs 4 can be turned. Therefore, the rotary head type magnetic tape recording and reproducing operation can be carried out.

In taking the magnetic tape cassette 1 out of the recording and reproducing device, the operations carried out in loading the cassette therein are performed in the reverse order. First, the guard panel 8 is disengaged from the panel opening means, which causes the guard panel 8 to close the front part of the opening 19 due to the guard panel spring 28. In succession, when the magnetic tape cassette 1 is pulled, the slide guard 20 is disengaged from the erroneous-insertion preventing protrusion. As a result, the slide guard 20 is slid toward the front of the cassette by the slide guard spring 25, thus completing closure of the opening 10.

When the guard panel 8 swings to close the opening 10, the right and left end pieces 17a of the guard panel 8 are disengaged from the pawls 24 of the lock member 6. As a result, the lock member 6 is slid toward the rear of the cassette by the spring 29, so that the protrusions 7 are abutted against the peripheral rings 4a of the hubs 4, thus preventing the hubs 4 from rotating. As the locking parts 17b of the guard panel 8 are brought into contact with the ends of the projections 19a of the lock member 6, the lock member 6 is prevented from sliding toward the front of the cassette. Furthermore, as the slide guard 20 slides to close the opening 10, the through-holes 23 are shifted from the reel shaft inserting holes 14 so that the holes 14 are closed.

In the above-described embodiment, the locking parts 17b are provided on both sides of the cassette; however, it is clear that the same effect can be obtained by providing the locking part on one side only.

As was described above, when the magnetic tape cassette 1 of the invention is in storage, the opening 10 is completely closed by the guard panel 8 and the slide guard 20, and the reel shaft inserting holes 14 are also closed by the slide guard 20. Therefore, the magnetic tape T laid along the opening 10 can be effectively prevented from damage and protected from dust. In addition, deterioration of the recording and reproducing characteristics of the magnetic tape can be sufficiently prevented.

Furthermore, according to the invention, when the magnetic tape cassette is stored or carried, the lock member 6 locks the hubs 4 with the aid of the lock member spring 29, and the locking parts 17b lock the lock member 6 so that the latter 6 can not be slid toward the front of the cassette. Therefore, the hubs 4 are positively prevented from being unintentionally rotated. Furthermore, even if a great impact is applied to the lock member 6, for instance, when the cassette is dropped carelessly, the lock member 6 will not be moved, thus preventing the magnetic tape from slackening or jamming. In addition, the locking parts 17b make it difficult to move the lock member 6 in the locking or releasing direction (i.e., the B or A direction, respectively), even when the pawls 24 do not function properly.

It has been described in the background section that the technical concept of the invention is applied to a magnetic tape cassette which is equal to or smaller than a conventional audio compact cassette (Phillips type) in size; however, it should be noted that the invention is not limited thereto or thereby. That is, the technical concept of the invention is applicable not only to conventional video tape cassettes but also to other kinds of magnetic tape cassettes.

What is claimed is:

1. A magnetic tape cassette of the type having a pair of hubs (4) on which a magnetic tape (T) is wound; said cassette further including:

normally activated braking means (6) for preventing rotation of at least one of said hubs when activated said braking means including a braking member extending in a substantially longitudinal direction of said cassette, and said braking member including a pair of protrusions (7) thereon for contacting respective ones of said pair of hubs when said braking means is activated; and means for automatically deactivating said braking means upon insertion of said cassette into a cassette machine, wherein said cassette further includes a cassette casing having an opening through which said magnetic tape can be accessed, and a movable guard member (8) for covering at least a portion of said opening, said means for deactivating comprises coupling means for coupling said guard member to said braking member, whereby said protrusions are moved out of engagement with said hubs when said guard member is opened, and wherein said guard member includes means (17b) for contacting said braking member to maintain said protrusions in engagement with said hubs when said guard member is closed.

2. A magnetic tape cassette as claimed in claim 1 wherein said coupling means comprises a pawl (24) at either end of said braking member and pawl-engaging surfaces (21) at either end of said guard member.

3. A magnetic tape cassette as claimed in claim 2 wherein said pawls extend from said braking member in a direction opposite to each other.

4. A magnetic tape cassette as claimed in claim 1, wherein said means for contacting comprises a locking tab at either end of said guard member for engaging said braking member.

* * * * *